United States Patent
Krantz et al.

(10) Patent No.: US 8,939,195 B2
(45) Date of Patent: Jan. 27, 2015

(54) HEAT EXCHANGER

(75) Inventors: Joakim Krantz, Kristianstad (SE); Kristian Walter, Genarp (SE)

(73) Assignee: Alfa Laval Corporate AB, Lund (SE)

( * ) Notice: Subject to any disclaimer, the term of this patent is extended or adjusted under 35 U.S.C. 154(b) by 551 days.

(21) Appl. No.: 12/747,986

(22) PCT Filed: Dec. 17, 2008

(86) PCT No.: PCT/EP2008/067431
§ 371 (c)(1),
(2), (4) Date: Jun. 14, 2010

(87) PCT Pub. No.: WO2009/080565
PCT Pub. Date: Jul. 2, 2009

(65) Prior Publication Data
US 2010/0258288 A1    Oct. 14, 2010

(30) Foreign Application Priority Data
Dec. 21, 2007 (SE) ..................... 0702872

(51) Int. Cl.
*F28F 3/08* (2006.01)
*B21D 53/04* (2006.01)
*B23P 15/26* (2006.01)
*F28D 9/00* (2006.01)
(Continued)

(52) U.S. Cl.
CPC ............. *F28D 9/005* (2013.01); *B23K 1/0012* (2013.01); *F28F 3/083* (2013.01); *F28F 3/10* (2013.01); *B23K 2201/14* (2013.01); *F28F 2275/04* (2013.01)
USPC ........ 165/79; 165/166; 165/167; 29/890.039; 29/890.054

(58) Field of Classification Search
USPC ......... 165/79, 166, 167; 29/890.039, 890.054
See application file for complete search history.

(56) References Cited

U.S. PATENT DOCUMENTS 3,250,323 A * 5/1966 Karmazin ..................... 165/150
4,359,087 A 11/1982 Johansson
(Continued)

FOREIGN PATENT DOCUMENTS

GB    2 064 750    6/1981
JP    5687797    7/1981
(Continued)

OTHER PUBLICATIONS

Chinese Office Action for Application No. 200880122571.5, dated Jul. 18, 2011.
(Continued)

*Primary Examiner* — Leonard R Leo
(74) *Attorney, Agent, or Firm* — Buchanan Ingersoll & Rooney PC

(57) ABSTRACT

A plate for the use in a heat exchanger cassette, where the plate comprises a corrugated pattern having a plurality of ridges (9) and valleys (10), and where the plate comprises a sealing gasket groove (3) encircling a heat transfer surface (8) that will be part of a contact-free fluid channel when two cassettes comprising at least one plate each are positioned adjacent each other, wherein the sealing gasket groove (3) comprises a base surface with a first, flat section (12) and a second, bent section (13), and where the bent section is angled with the angle α. The advantage of the inventive plate is that an airtight heat exchanger cassette can be obtained in an easy and cost-effective way.

14 Claims, 2 Drawing Sheets

(51) Int. Cl.
    *B23K 1/00*     (2006.01)
    *F28F 3/10*     (2006.01)

(56) References Cited

U.S. PATENT DOCUMENTS

| | | | | |
|---|---|---|---|---|
| 4,845,073 | A | * | 7/1989 | Cyron ............................ 502/439 |
| 5,523,158 | A | * | 6/1996 | Kapoor et al. ................. 428/408 |
| 5,917,156 | A | * | 6/1999 | Nobori et al. ................. 174/250 |
| 6,182,746 | B1 | | 2/2001 | Wiese |
| 6,340,054 | B1 | * | 1/2002 | Schwarz et al. .............. 165/167 |
| 7,426,957 | B2 | * | 9/2008 | Hendrix et al. ............... 165/166 |
| 2008/0156852 | A1 | * | 7/2008 | Prakash ........................ 228/256 |

FOREIGN PATENT DOCUMENTS

| | | |
|---|---|---|
| JP | 5827662 | 8/1981 |
| JP | 04-347496 | 12/1992 |
| JP | 05-264193 | 10/1993 |
| JP | 2000146469 A | 5/2000 |
| JP | 2001-272194 | 10/2001 |
| JP | 2005-106412 | 4/2005 |
| SE | 445 139 | 6/1986 |
| WO | 93/06426 | 4/1993 |
| WO | WO9606320 A1 | 2/1996 |
| WO | 96/06705 | 3/1996 |
| WO | 2006/080874 | 8/2006 |

OTHER PUBLICATIONS

Rejection Notice for Japanese Application No. 2010-538607 dispatched on Feb. 14, 2012.

Office Action (Rejection Notice) for Japanese Patent Application No. 2010-538607 dated Dec. 4, 2012 in English.

* cited by examiner

HEAT EXCHANGER

TECHNICAL FIELD

The present invention relates to a heat exchanger plate for a plate heat exchanger having a contact-free distribution passage. The invention also relates to a cassette comprising two heat exchanger plates for a plate heat exchanger having a contact-free distribution passage. The invention further relates to a heat exchanger comprising a plurality of heat exchanger cassettes. The invention further relates to a method for assembling a cassette comprising two heat exchanger plates.

BACKGROUND ART

Food manufacture is typically characterised by the need to process and treat highly viscous products, e.g. concentrates for carbonated beverages, juices, soups, dairy products and other products of fluid consistency. For natural reasons, the hygiene aspirations and expectations in this context are extremely high to enable the requirements of various authorities to be met.

Plate heat exchangers are used in the industry for a number of different purposes. One problem in using plate heat exchangers for e.g. the food industry is that some products contain fibres and other solid materials mixed in the fluid. In most plate heat exchangers, the heat exchanger comprises one type of plate, which is mounted with every other plate rotated 180 degrees to form two different channels for the fluids, one channel for the cooling medium and one channel for the product that is to be cooled. Between each plate is a sealing provided. Such an arrangement is cost-effective and works for many applications, but shows some drawbacks when it comes to beverages and other products that comprises fibres and other solid materials, since the plates will bear on each other at some contact points. Each plate is provided with ridges and valleys in order to on one hand provide a mechanical stiffness and on the other hand to improve the heat exchange to the liquid. The plates will bear on each other where the patterns of the plates meet each other, which will improve the mechanical stiffness of the plate package. This is important especially when the fluids have different pressures. A drawback of the plates bearing on each other is that each bearing point will constitute a flow restriction where material contained in the liquid may be trapped and can accumulate. The accumulated material will restrict the flow further, causing more material to accumulate. This will somewhat resemble the formation of a river delta, where a small flow difference will deposit some material which in turn causes more material to deposit.

One solution to the problem with clogging of material in a plate heat exchanger is to use a heat exchanger where the product passage is contact-free. This type of heat exchanger reduces the accumulation of material in the product passage. In order to obtain a sufficient rigidity when using traditionally heat exchanger plates for a contact-less plate heat exchanger, the plates are permanently joined together in pairs, e.g. by welding or brazing. In this way, two plates form a cassette with a plurality of contact points between the plates, where the contact points are joined together as well as the rim of the plate. The cassette will be rigid enough to handle some differences in pressure between the two fluids, thereby enabling the contact-free product passage. Since the heating/cooling fluid passage will be inside the cassette, it is important that the two plates are joined together without any leakage. Especially if the heating/cooling fluid will have a relatively high pressure, even a small leakage will cause problems. It is thus indispensable that a completely airtight joint is achieved around the cassette.

One plate heat exchanger having a contact-free passage is known from JP 2001-272194. In this heat exchanger, two plates of the same type having longitudinal grooves are permanently connected to each other to form a cassette, in which longitudinal passages are formed for the heat exchange fluid. Such cassettes are stacked using gaskets, thereby forming a contact-free product passage between two cassettes.

Another heat exchanger having a contact-free product passage is disclosed in WO 2006/080874. In the disclosed heat exchanger, a corrugated and undulating pattern perpendicular to the flow direction is used in order to provide rigidity to the plates and also to improve the heat transfer between the two fluids.

The heat exchanger disclosed in WO 2006/080874 is a so-called semiwelded plate heat exchanger, i.e. a heat exchanger comprising a number of cassettes formed by welding or brazing heat exchanger plates together in pairs. The weld seam normally runs along the side edges of the cassettes and around the portholes. A gasket is disposed between the respective cassettes and is normally made of a rubber material and situated in a groove of the heat exchanger plate. One fluid flows inside the cassettes, and another fluid between the cassettes. The flow passage inside the cassettes is used for the heating/cooling fluid and the flow passage between the cassettes is used for the fibrous fluid. Semiwelded plate heat exchangers tolerate relatively high pressures and make it possible to open the plate package and clean the spaces between pairs of welded heat exchanger plates. The welds which replace the gaskets in every second space between plates round the heat exchange surface of the heat exchanger plates reduce the need for gasket replacement and enhance safety. Tolerances in the plates and/or the joining technique may give an imperfect result or may reduce the maximal allowed pressure in the cassette.

These solutions may function for some applications, but they still show some disadvantages. There is thus room for improvements.

DISCLOSURE OF INVENTION

An object of the invention is therefore to provide an improved plate for a plate heat exchanger and to provide an improved cassette comprising at least one inventive plate.

With a plate for the use in a heat exchanger cassette, where the plate comprises a corrugated pattern having a plurality of ridges and valleys, and where the plate comprises a sealing gasket groove encircling a heat transfer surface that will be part of a contact-free fluid channel when two cassettes are positioned adjacent each other, the object of the invention is achieved in that the sealing gasket groove comprises a base surface with a first, flat section and a second, bent section, where the bent section is angled with the angle $\alpha$ being in the interval of 1 to 25 degrees.

By this first embodiment of the plate for a heat exchanger, a gasket groove of the plate used for the permanent joining of two plates into a cassette is adapted such that the joint of the cassette is improved. In this way, an airtight joint is possible to obtain in a reliable and cost-effective way. The problems caused by the tolerances in the joining process are, depending on type of problem, lowered or eliminated.

This is advantageous in that cassettes used in heat exchangers having contact-free channels can be manufactured in a reliable and cost-effective way. The inventive plate makes it possible to obtain a reliable joint of two plates making up a cassette, without interfering with the sealing gasket groove. When two cassettes assembled from plates according to the invention are placed adjacent each other with a sealing gasket in the gasket groove there between, a contact-free channel is created which is reliable sealed with the sealing gasket. This makes it possible to use existing sealing gaskets, since the dimensions of the gasket groove are substantially unaffected by the invention.

In an advantageous development of the inventive plate, the length $l_2$ of the second, bent section is in the interval of 10% to 90% of the length $l_1$ of the first, flat section. More preferably, the length $l_2$ of the second, bent section is in the interval of 10% to 40% of the length $l_1$ of the first, flat section. The advantage of this is that the contact surface between the two plates making up a cassette is large enough to ensure a reliable joint between the plates.

In another advantageous development of the inventive plate, the angle α is in the interval of 1 to 25 degrees. More preferably, the angle α is in the interval of 1 to 20 degrees and even more preferably, angle α is in the interval of 3 to 10 degrees. The advantage of this is that a cavity in which excessive brazing solder can be accommodated is created. This allows for a reliable joint, since the excessive solder will compensate for tolerances in the heat exchanger plates. Where the plates are not completely flat, more brazing solder is required for the joint, and where the plates are flat, less brazing solder is required for the joint. The created cavity ensures that a reliable joint is achieved over the complete cassette, and accommodates excessive brazing solder.

In an advantageous further development of the inventive plate, the second, bent section of the gasket groove is located towards the centre of the plate. The advantage of this is that the assembly of plates into cassettes is facilitated.

In an inventive heat exchanger cassette, at least one inventive heat exchanger plate is comprised. This is advantageous in that an airtight joint is possible to obtain in a reliable and cost-effective way.

In an advantageous further development of the inventive heat exchanger cassette, two inventive plates are used for the cassette. The advantage of this is that an airtight joint is possible to obtain in a reliable and cost-effective way.

In an advantageous further development of the inventive heat exchanger cassette, the bent sections create a wedge-shaped cavity. The advantage of this is that a smooth transition section is created between the bent and the flat section.

In an advantageous further development of the inventive heat exchanger cassette, the wedge-shaped cavity is located towards the centre of the cassette. The advantage of this is that the assembly of the cassette is facilitated.

In an advantageous further development of the inventive heat exchanger cassette, the cassette is assembled by a brazing process. The advantage of this is that a reliable joint is achieved. By brazing, the plates will be less subjected to heat strain since the temperature used is relatively low. This will raise the amount of cassettes that meets the required tolerances.

In an advantageous further development of the inventive heat exchanger cassette, the excessive brazing solder is located in the wedge-shaped cavity. The advantage of this is that the assembly of the cassette is facilitated.

In an inventive heat exchanger, a plurality of inventive heat exchanger cassettes is comprised. This is advantageous in that an improved heat exchanger is provided, in which the joints joining the cassettes are reliable.

In an inventive method for assembling heat exchanger cassettes, using heat exchanger plates according to the invention, the steps of applying brazing solder solely on at least one of the second, bent sections of the heat exchanger plates, assembling the two plates to each other, and brazing the cassette in a brazing process are comprised. The advantage of the method is that the brazing solder is not applied on the surfaces that will bear on each other. By this, the positioning of one plate to the other is improved, since there is no brazing solder on the bearing surfaces that will interfere with the positioning of the plates.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
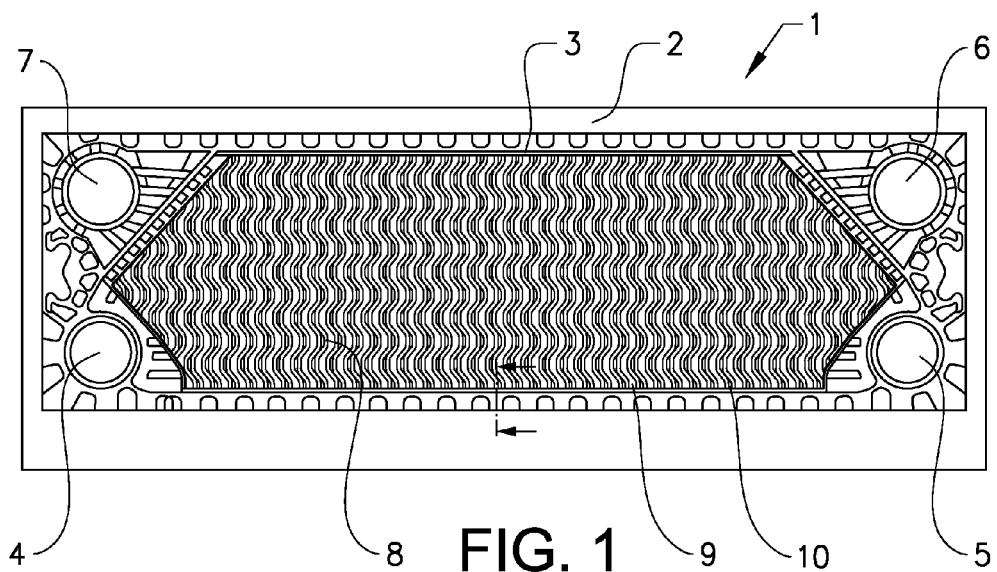
FIG. 1 shows a front view of a cassette according to the invention.

FIG. 1 shows a front view of a cassette 1 for the use in a heat exchanger according to the invention. The cassette 1 comprises two heat exchanger plates 2 permanently joined together. The plates have at least four portholes constituting inlet and outlet ports 4, 5, 6, 7 and a heat transfer surface 8 with ridges 9 and valleys 10. The cassette 1 is produced by brazing the plates together, whereby the two plates 2 are joined together permanently along their periphery, at the diagonal gasket groove and around at least two of ports 4, 5, 6, 7. Preferably, the plates are joined also in the heat transfer surface, where the pattern of one plate will bear on the pattern of the other plate. The plates may e.g. be joined along a few longitudinal lines reaching from one inlet/outlet side to the other inlet/outlet side. The cassette further comprises a gasket groove 3 extending around the cassette in which a sealing gasket can be mounted in order to seal of the contact-free passage when the cassettes are assembled to form a heat exchanger.

Figure 2:
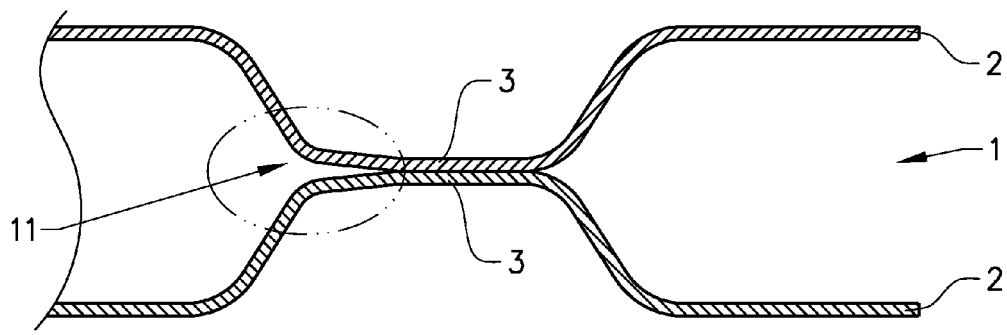
FIG. 2 shows a detail of a longitudinal cross-cut of the periphery of a cassette according to FIG. 1.

FIG. 2 shows a detail of a longitudinal cross-cut A-A of the periphery of an inventive cassette. A cassette 1 is made from two heat exchanger plates of the same type 2. One plate is rotated by 180° around a horizontal centre axis before the plates are joined. In this way, the pattern will interact such that the pattern of one plate will bear on the pattern of the other plate, creating a plurality of intermediate contact points. When all or at least some of these contact points are permanently joined together, a stiff cassette that will withstand a certain overpressure as well as negative pressure is obtained. The gasket groove 3 is an indentation in the plate 2. When one plate is rotated in order to obtain a cassette, the gasket grooves of the two plates will bear on each other. Since the plate is designed to be assembled in this way, the gasket grooves will provide the joining surface for the two plates.

In the present heat exchanger cassettes, the joining surfaces of the plates, i.e. the base surfaces of the gasket grooves, are completely flat. A flat surface may be of advantage when the plates are welded together or glued together, but shows some drawbacks when the cassettes are brazed together. Before the plates are placed on each other, a brazing solder is applied to one or both of the surfaces. The areas are then heated in order to melt the brazing solder to join the plates. Depending on tolerances in the plates and/or the application of brazing solder, some imperfections in the joint may be obtained at some points. If the plates are not completely flat or if too much or too little brazing solder is applied to the surface, untight spots may occur.

Figure 3:
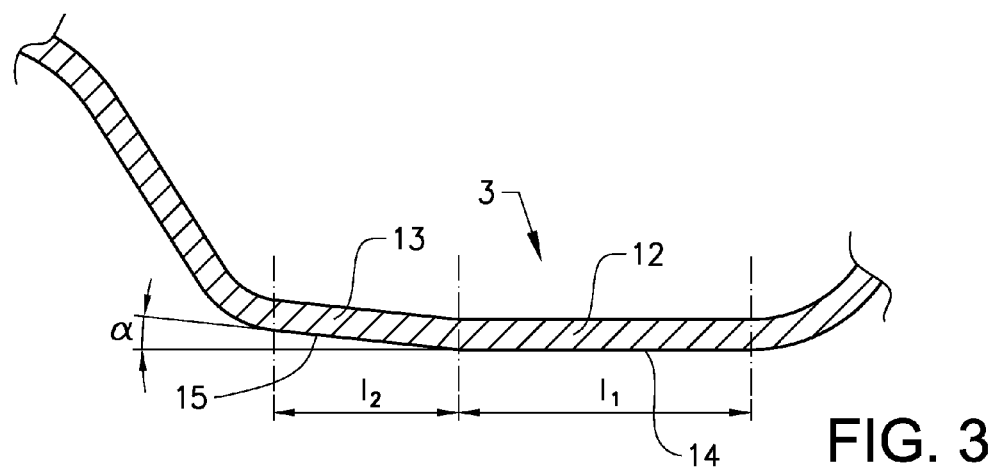
FIG. 3 shows a detail of the gasket groove of a plate according to the invention.

In an inventive heat exchanger plate, of which a detail is shown in FIG. 3, the base surface of the gasket groove 3 is divided in a first, flat section 12 and a second, bent section 13. The first, flat section is substantially flat and is located on the outside of the gasket groove, on the side towards the outer periphery of the plate. The second, bent section is angled upwards into the gasket groove with an angle α relative the flat section. The second, bent section is located on the inside of the gasket groove, towards the centre of the plate. The first, flat section comprises a first, outer surface 14 and the second, bent section comprises a second, outer surface 15. The length $I_1$ of the first, flat section may be longer than the length $I_2$ of the second, bent section. Advantageously, $I_2$ is in the interval between 10% and 90% of $I_1$, and more preferably in the interval between 10% and 40% of $I_1$. The angle α is preferably in the range between 1 to 25 degrees, more preferably in the range between 1 to 20 degrees and even more preferably in the range between 3 to 10 degrees.

The purpose of the bent section is to create a cavity in which brazing solder can be applied before two plates are assembled into a cassette, and where excessive brazing solder can be located after the cassette is assembled.

Figure 4:
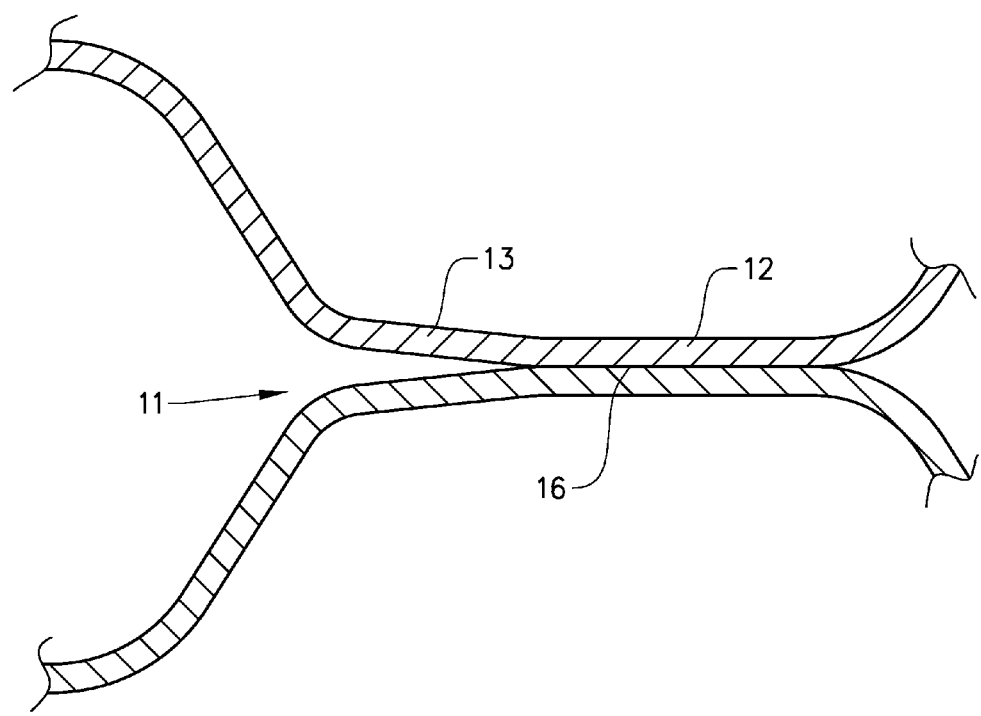
FIG. 4 shows a detail of a cassette according to FIG. 2.

In an inventive cassette, comprising two plates with a gasket groove according to the invention, the two bent sections 13 of the plates are placed adjacent each other. When two plates are placed on each other, with the base surfaces 14 bearing on each other, a wedge-shaped cavity 11 is obtained at the inner side of the joint of the cassette, between the two plates. A detail of a cassette is shown in FIG. 4.

When the inventive cassette is to be manufactured, brazing solder is applied to one or both of the first outer surfaces 15 of the bent sections 13. By applying brazing solder solely to the outer surface 15 of the bent section 13, it is guaranteed that the base surfaces 14 can bear on each other as good as possible without interference of the brazing solder. The plates are then positioned on each other and heat is applied to the plate or to the gasket groove. The brazing solder melts by the heat and is absorbed from the wedge-shaped cavity into the gap 16 between the first, outer surfaces 14 by capillary force. In this way, only the amount of brazing solder that is needed to join the plates is absorbed into the gap 16. Thus, there is no risk that too much brazing solder will create an untight spot in the joint. At the same time, should there be a small gap between two plates due to tolerances in the plate, enough brazing solder will be absorbed into the gap in order to achieve a tight joint. Thus, there is no risk that too little brazing solder will create an untight spot in the joint. It is of course also possible to apply a small amount of brazing solder also on the first, outer surface 14 of the flat section 12. A small amount of brazing solder may improve the brazing process by allowing the brazing solder to be absorbed into the gap in a quicker way. It is in this case important that only a small amount of the brazing solder is applied to the flat section, preferably less than 20% of the brazing solder.

Preferably, a slightly excessive amount of brazing solder is applied to the second, outer surfaces 15 of the bent portions 13. In this way, it is secured that there will always be a sufficient amount of brazing solder in order to obtain a tight joint. The excessive brazing solder, i.e. the amount that is not absorbed into the gap 16, will remain in the wedge-shaped cavity 11. The brazing solder remaining in the wedge-shaped cavity 11 will contribute to the strength of the joint. It is therefore of advantage to apply an amount of brazing solder that will fill the gap 16 and at least half of the wedge-shaped cavity 11 for the tolerances of the plates. The exact amount of brazing solder to apply is determined e.g. by the dimensions of the gasket groove 3, the tolerances of the plate, the dimensions of the wedge-shaped cavity and the tolerances in the application of the brazing solder. Advantageously, around half of the wedge-shaped cavity is filled with brazing solder when the cassette is assembled.

The gasket groove for the ring gasket surrounding the inlet and outlet opening for the inner fluid passage of the cassette is in the same way provided with an inner, bent section. This gasket groove is joined in the same way.

In a further embodiment of a cassette, where two different heat exchanger plates are used for the cassette, only one of the plates comprises a gasket groove with a bent section. The angle α of the bent section may in this case be larger than for the case when two plates having a bent section is used, in the in order to create a wedge-shaped cavity with the same dimension.

The invention is not to be regarded as being limited to the embodiments described above, a number of additional variants and modifications being possible within the scope of the subsequent patent claims. The invention is suitable for all joints in a heat exchanger cassette, where an airtight joint is required.

REFERENCE SIGNS

1: Cassette
2: Heat exchanger plate
3: Gasket groove
4: Port
5: Port
6: Port
7: Port
8: Heat transfer surface
9: Ridge
10: Valley
11: Wedge-shaped cavity
12: Flat portion
13: Bent portion
14: First outer surface
15: Second outer surface
16: Gap

The invention claimed is:

1. A heat exchanger cassette comprising a first heat exchanger plate and a second heat exchanger plate,
   wherein the first heat exchanger plate comprises a corrugated pattern having a plurality of ridges and valleys and further comprises a first sealing gasket groove encircling a first heat transfer surface that is adapted to be part of a contact-free fluid channel when the cassette is positioned adjacent to another cassette,
   wherein the first sealing gasket groove comprises a first base surface and first side surfaces, the first base surface being connected to each of the first side surfaces by respective first bends of the first heat exchanger plate, the first base surface including a first flat section arranged substantially parallel to the first heat transfer surface of the first heat exchanger plate and a second bent section, the second bent section being located between the first flat section and one of the first bends as seen in a lateral cross-section, and wherein the second bent section is angled with respect to the first flat section, with the angle being in the interval of 1 to 25 degrees, wherein the second heat exchanger plate comprises a second sealing gasket groove encircling a second heat transfer surface, wherein the second sealing gasket groove comprises a second base surface and second side surfaces, the second base surface being connected to each of the second side surfaces by respective second bends of the second heat exchanger plate, the second base surface including a third flat section arranged substantially parallel to the second heat transfer surface and a fourth bent section angled with respect to the third flat section, the fourth bent section being located between the third flat section and one of the second bends as seen in a lateral cross-section, wherein the second bent section and the fourth bent section diverge in opposite directions.

2. The heat exchanger cassette according to claim 1, wherein the length of the second bent section is in the interval of 10% to 90% of the length of the first flat section.

3. The heat exchanger cassette according to claim 1, wherein the length of the second bent section is in the interval of 10% to 40% of the length of the first flat section.

4. The heat exchanger cassette according to claim 1 or claim 2, wherein the angle is in the interval of 1 to 20 degrees.

5. The heat exchanger cassette according to claim 1 or claim 2, wherein the angle is in the interval of 3 to 10 degrees.

6. The heat exchanger cassette according to claim 1 or claim 2, wherein the second bent section of the gasket groove is located towards the centre of the plate.

7. The heat exchanger cassette according to claim 1, wherein the second and fourth bent sections create a wedge-shaped cavity.

8. The heat exchanger cassette according to claim 7, wherein the wedge-shaped cavity is located towards the centre of the cassette.

9. The heat exchanger cassette according to claim 1, wherein the cassette is assembled by a brazing process.

10. The heat exchanger cassette according to claim 8, wherein the wedge-shaped cavity is adapted to hold excessive brazing solder.

11. A heat exchanger, comprising a plurality of heat exchanger cassettes according to claim 1.

12. A method of assembling the heat exchanger cassette according to claim 1 or claim 2, comprising:
applying brazing solder solely on at least one of the second and fourth bent sections,
assembling the first and second heat exchanger plates to each other, and
brazing the heat exchanger cassette in a brazing process.

13. A heat exchanger comprising:
a first cassette and a second cassette;
a gasket positioned between the first cassette and the second cassette;
the first cassette including a first plate and a second plate;
the first plate including a first heat transfer surface encircled by a first gasket groove, the gasket being positioned in sealing engagement with the first gasket groove;
the second plate including a second heat transfer surface encircled by a second gasket groove;
a bottommost portion of the first gasket groove abutting against a bottommost portion of the second gasket groove;
the first gasket groove including a first bent section bent at 1-25 degrees relative to the bottommost portion of the first gasket groove, the first gasket groove also including a first side surface connected to the first bent section by a bend;
the second gasket groove including a second bent section bent relative to the bottommost portion of the second gasket groove, the second gasket groove also including a second side surface connected to the second bent section by a bend; and
wherein the first bent section of the first gasket groove and the second bent section of the second gasket groove diverge in opposite directions to create a gap configured to hold solder.

14. A heat exchanger cassette comprising a first heat exchanger plate and a second heat exchanger plate,
wherein the first heat exchanger plate comprises a corrugated pattern having a plurality of ridges and valleys and further comprises a first sealing gasket groove encircling a first heat transfer surface that is adapted to be part of a contact-free fluid channel when the cassette is positioned adjacent to another cassette, wherein the first sealing gasket groove comprises a first base surface and first side surfaces, the first base surface being connected to each of the first side surfaces by respective first bends of the first heat exchanger plate, the first base surface including a first flat section arranged substantially parallel to the first heat transfer surface of the first heat exchanger plate and a second bent section, the second bent section intersecting one of the first side surfaces at an intersection, the second bent section being located between the first flat section and one of the first bends as seen in a lateral cross-section, wherein the second bent section intersects the first flat section at an intersection which is spaced from the intersection of the second bent section and the one of the first side surfaces, wherein the second bent section is angled with respect to the first flat section, with the angle being in the interval of 1 to 25 degrees, wherein the second heat exchanger plate comprises a second sealing gasket groove encircling a second heat transfer surface, wherein the second sealing gasket groove comprises a second base surface and second side surfaces, the second base surface being connected to each of the second side surfaces by respective second bends of the second heat exchanger plate, the second base surface including a third flat section arranged substantially parallel to the second heat transfer surface and a fourth bent section angled with respect to the third flat section, the fourth bent section intersecting one of the second side surfaces at an intersection, the fourth bent section being located between the third flat section and one of the second bends as seen in a lateral cross-section, wherein the fourth bent section intersects the third flat section at an intersection which is spaced from the intersection of the fourth bent section and the one of the second side surfaces, wherein the second bent section and the fourth bent section diverge in opposite directions.

* * * * *